(12) United States Patent
Zurek et al.

(10) Patent No.: US 7,620,642 B2
(45) Date of Patent: Nov. 17, 2009

(54) MAPPING DATA STRUCTURES

(75) Inventors: Thomas F. Zurek, Walldorf (DE);
Stefan Dipper, Wiesloch (DE); Stefan Unnebrink, Neckargemuend (DE);
Klaus Nagel, Heidelberg (DE); Erich R. Marschall, Nussloch (DE); Franz X. Faerber, Walldorf (DE); Guenter Radestock, Karlsruhe (DE); Christian M. Bartholomae, Oftersheim (DE)

(73) Assignee: SAP AG, Walldorf (DE)

( * ) Notice: Subject to any disclaimer, the term of this patent is extended or adjusted under 35 U.S.C. 154(b) by 275 days.

(21) Appl. No.: 11/302,855

(22) Filed: Dec. 13, 2005

(65) Prior Publication Data
US 2007/0136323 A1 Jun. 14, 2007

(51) Int. Cl.
*G06F 17/00* (2006.01)
(52) U.S. Cl. .................................. 707/100; 707/102
(58) Field of Classification Search ................. None
See application file for complete search history.

(56) References Cited
U.S. PATENT DOCUMENTS

| | | | |
|---|---|---|---|
| 5,905,985 A * | 5/1999 | Malloy et al. ............ 707/100 |
| 6,161,103 A * | 12/2000 | Rauer et al. ............... 707/4 |
| 6,847,973 B2 * | 1/2005 | Griffin et al. .............. 707/101 |
| 2002/0029207 A1 * | 3/2002 | Bakalash et al. ........... 707/1 |
| 2004/0133551 A1 * | 7/2004 | Linstedt ..................... 707/1 |
| 2007/0011134 A1 * | 1/2007 | Langseth et al. ........... 707/1 |
| 2007/0011175 A1 * | 1/2007 | Langseth et al. ........... 707/100 |
| 2007/0011183 A1 * | 1/2007 | Langseth et al. ........... 707/101 |

* cited by examiner

*Primary Examiner*—Jean B. Fleurantin
*Assistant Examiner*—Aleksandr Kerzhner
(74) *Attorney, Agent, or Firm*—Mintz, Levin, Cohn, Ferris, Glovsky and Popeo, P.C.

(57) ABSTRACT

A first data storage schema in which a characteristic in a first dimension table is mapped by a first table and a second table can be received and a second data storage schema can be received. The first table maps the characteristic to a first object that include attributes to which time information is irrelevant to data processing activities and the second maps the characteristic to a second object that includes attributes to which time information is relevant to data processing activities. The second data storage schema includes a fact table including at least some facts drawn from the first data storage schema and a second dimension table that includes at least some characteristics drawn from at least one of the first object and the second object.

20 Claims, 11 Drawing Sheets

| 205 | 101005.1223 | 350.553 | 176 | ... |
|---|---|---|---|---|
| 205 | 101005.1228 | 250.450 | 166 | ... |
| 205 | 101005.1244 | 350.550 | 072 | ... |
| 205 | 101005.1403 | 350.553 | 190 | ... |
| 205 | 101005.1450 | 250.220 | 004 | ... |
| 205 | 101005.1507 | 350.553 | 066 | ... |
| | 210 | 215 | 220 | 225 |

| 305 | 173 | 17 | Flatbush Avenue | NY | NY | ... |
| --- | --- | --- | --- | --- | --- | --- |
| 310 | 174 | 2224 | Willow Place | NY | NY | ... |
| 315 | 175 | 3145 | Union Street | SD | CA | ... |
| 320 | 176 | 16 | Lighthouse Lane | SD | CA | ... |
| 325 | 177 | 3421 | 34th Street | LA | CA | ... |
| 330 | 178 | 224 | 2nd Avenue | LA | CD | ... |
|  | 335 | 340 | 345 | 350 | 355 | 360 |

| | KEY/ IUSALESP | KEY/ IUSALEST | KEY/ IUSALESU | KEY/ IUSALES1 | KEY/ IUSALES2 | KEY/ IUSALES3 | /BIC/ IUPROFIT | /BIC/ IUQUAN |
|---|---|---|---|---|---|---|---|---|
| 505 | 5 | 731 | 0 | 29 | 62 | 62 | 982 | 820 |
| 505 | 5 | 732 | 0 | 30 | 63 | 63 | 1.051 | 140 |
| 505 | 5 | 732 | 0 | 31 | 66 | 89 | 3.389 | 390 |
| 505 | 5 | 732 | 0 | 41 | 79 | 82 | 31 | 140 |
| 505 | 5 | 732 | 0 | 46 | 70 | 79 | 2.144 | 540 |
| | 510 | 515 | 520 | 525 | 530 | 535 | 540 | 545 |

FIG. 5

| | DIMID | SID IUCITY | SID IUCOUNTRY | SID IUREGION |
|---|---|---|---|---|
| 605 | 0 | 0 | 0 | 0 |
| 605 | 29 | 2 | 2 | 2 |
| 605 | 30 | 3 | 3 | 3 |
| 605 | 31 | 4 | 4 | 4 |
| 605 | 32 | 5 | 5 | 5 |
| | 610 | 615 | 620 | 625 |

FIG. 6

| | SID | OBJUERS | /BIC/ IUCITY | CHANGED | S IUPOP |
|---|---|---|---|---|---|
| 705 | 0 | A | | | 0 |
| 705 | 2 | A | LYON | | 2.000.000 |
| 705 | 4 | A | MONTREAL | | 2.000.000 |
| 705 | 3 | A | NEWCASTLE | | 600.000 |
| 705 | 5 | A | SAN DIEGO | | 2.150.000 |
| 705 | 1 | A | WALLDORF | | 0 |
| | 710 | 715 | 720 | 725 | 730 |

FIG. 7

| / BIC / IUPOP | SID | CHCKFL | DATAFL | INCFL |
|---|---|---|---|---|
| ☐ 000000000 | 0 | X | X | X |
| ☐ 000500000 | 500.000 | | X | X |
| ☐ 000600000 | 600.000 | | X | X |
| ☐ 000800000 | 800.000 | | X | X |
| ☐ 001000000 | 1.000.000 | | X | X |

FIG. 8

| / BIC / IUCOUNTRY | LANGU | TXTSH |
|---|---|---|
| ☐ AU | E | Australia |
| ☐ CA | D | Kanada |
| ☐ CA | E | Canada |
| ☐ CN | D | China |
| ☐ CN | E | China |
| ☐ DE | D | Deutschland |
| ☐ DE | E | Germany |
| ☐ ES | D | Spanien |
| ☐ ES | E | Spain |
| ☐ FR | D | Frankreich |
| ☐ FR | E | France |
| ☐ HK | D | Hong Kong |
| ☐ HK | E | Hong Kong |
| ☐ IN | D | Indien |
| ☐ IN | E | India |
| ☐ IT | D | Italien |
| ☐ IT | E | Italy |
| ☐ KR | D | Sued Korea |
| ☐ KR | E | South Korea |
| ☐ MY | D | Malaysia |
| ☐ MY | E | Malaysia |
| ☐ SG | D | Singapur |
| ☐ SG | E | Singapore |
| ☐ UK | D | Grossbritannien |
| ☐ UK | E | United Kingdom |
| ☐ US | D | USA |
| ☐ US | E | USA |

FIG. 9

| ... | 0 | A |  | 0 | 000000000 | X | X | X | ... |
|---|---|---|---|---|---|---|---|---|---|
| ... | 29 | A | Lyon | 2.000.000 | 002000000 |  | X | X | ... |
| ... | 30 | A | Newcastle | 600.000 | 000600000 |  | X | X | ... |
| ... | 31 | A | Montreal | 2.000.000 | 002000000 |  | X | X | ... |
| ... | 32 | A | San Diego | 2.150.000 | 002150000 |  | X |  | ... |
1520  1505  1510  1515  1520
FIG. 15
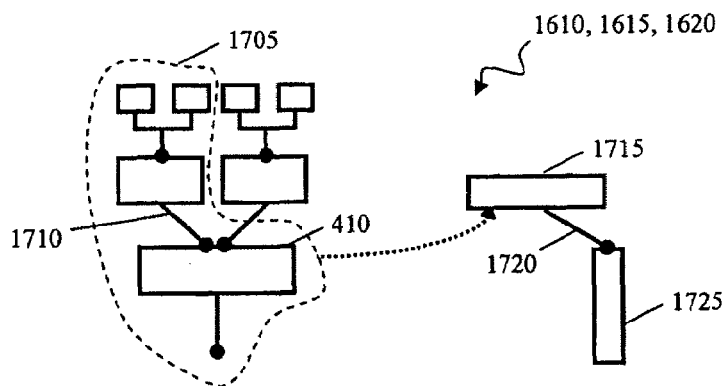
FIG. 17
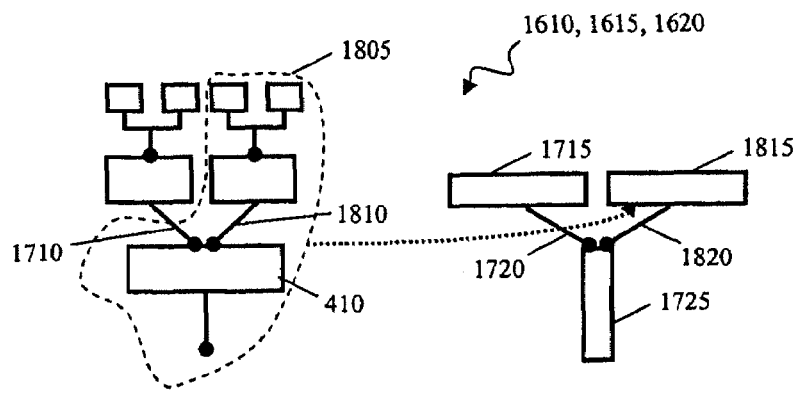
FIG. 18

MAPPING DATA STRUCTURES

BACKGROUND

The subject matter disclosed herein relates to mapping data structures.

The storage of information by a machine can be tailored for operational efficiency and effectiveness in different contexts. For example, information can be stored in data structures that are tailored to facilitate analysis, modification, and/or size minimization. Information can also be stored in data structures that are tailored to the data storage parameters specified by proprietary, legacy, and/or other applications.

Even though tailoring of data structures can be operationally effective in one context, tailoring can potentially limit the accessibility of the stored information in other contexts. For example, a data structure that facilitates rapid transactions may slow querying and other data analysis. As another example, a data structure that has been tailored to the parameters required by a first system can impair access to the stored information by a second system.

The mapping of data structures facilitates the rearrangement of information that has been stored in a first data structure so that some or all of the information can be stored in a second data structure. Mapping can include establishing a protocol or a set of directions for rearranging stored information. Mapping can also include the actual process of rearranging stored information from one data structure to another.

SUMMARY

The subject matter disclosed herein relates to systems and techniques for mapping data structures in a data processing environment to help ensure the accessibility of stored information.

In one aspect, an article comprises a machine-readable medium storing instructions. The instructions are operable to cause one or more machines to perform operations. The operations include receiving a first data storage schema in which a characteristic in a first dimension table is mapped by a first table and a second table and generating a second data storage schema. The first table maps the characteristic to a first object that include attributes to which time information is irrelevant to data processing activities and the second table maps the characteristic to a second object that include attributes to which time information is relevant to data processing activities. The second data storage schema includes a fact table including at least some facts drawn from the first data storage schema and a second dimension table that includes at least some characteristics drawn from at least one of the first object and the second object.

This and other aspects can include one or more of the following features. The first dimension table can be resolved to a first fact table in the first data storage schema and/or to at least one of the first table and the second table. For example, the first dimension table can be resolved to only one of the first table and the second table. The second data storage schema can be a star data storage schema. A pair of fact tables in the received first data storage schema can be combined to generate a fact table. The first data storage schema can include a first fact table and the fact table in the second data storage schema can be a copy of the first fact table.

In an interrelated aspect, an article includes a machine-readable medium storing instructions. The instructions are operable to cause one or more machines to perform operations. The operations include receiving a first data storage schema having a first fact table and a line item dimension, and generating a second data storage schema comprising a second fact table including at least some facts drawn from the first fact table and at least some characteristics drawn from the line item dimension. The line item dimension can include a collection of data records that include only a single characteristic for mapping facts in the first fact table to an object.

In an interrelated aspect, an article includes a machine-readable medium storing instructions. The instructions are operable to cause one or more machines to perform operations. The operations include receiving a first data storage schema comprising a first fact table, a line item dimension, a first dimension table, and a first surrogate identification table, and generating a second data storage schema comprising a second fact table and a second dimension table. The line item dimension includes a collection of data records that include only a single characteristic for mapping facts in the first fact table to a first object. The first surrogate identification table includes information for mapping a characteristic in the first dimension table to a second object. The second dimension table includes at least some attributes drawn from the second object.

This and other aspects can include one or more of the following features. The second fact table can include at least some information drawn from the first dimension table. The second data storage schema can be a star schema. The second dimension table can include at least some characteristics drawn from the first dimension table. The first data storage schema can also include a third fact table and the second data storage schema can be generated by combining the first fact table and the. second fact table.

The first data storage schema can include a first table and a second table. The first table can map the characteristic to a first object that include attributes to which time information is irrelevant to data processing activities. The second table can map the characteristic to a second object that include attributes to which time information is relevant to data processing activities. The second dimension table can be generated so that it includes at least some characteristics drawn from at least one of the first object and the second object. For example, the second dimension table can be generated so that it includes characteristics drawn from only one of the first object and the second object.

One or more surrogate identification tables that include information for mapping a characteristic into the second dimension table can be resolved to generate the second data storage schema. The second data storage schema can also be generated by resolving one or more text tables that include a textual description of dimension data into the second dimension table or by copying the first fact table to generate the second fact table.

In an interrelated aspect, a method includes receiving a first data storage schema that includes a first fact table, one or more dimension tables that are exclusive to the first fact table, and one or more additional tables that relate to characteristics in the dimension tables, and generating a second data storage schema. Generating the second data storage schema includes generating a new fact table that includes data drawn from the first fact table, and generating one or more new dimension tables that relate to the new fact table. The new dimension tables include data drawn from the additional tables.

This and other aspects can include one or more of the following features. The additional tables can include a first table and a second table. The first table can map a characteristic in the one or more dimension tables to a first object that include attributes to which time information is irrelevant to data processing activities. The second table can map the characteristic to a second object that include attributes to which time information is relevant to data processing activities. One or more of the dimension tables can be resolved with the one or more additional tables. The one or more additional tables can include one or more text tables that include a textual description of dimension data, one or more surrogate identification tables that include information for mapping the one or more characteristic to an object, and/or one or more temporary hierarchy tables.

Computer program products, tangibly embodied in information carriers are also described. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

The details of one or more implementations are set forth in the accompanying drawings and description. Other features and advantages will be apparent from the description and drawings, and from the claims.

DESCRIPTION OF DRAWINGS

FIG. 5 shows an example fact table that can be included in the star schema of FIG. 4.

FIG. 6 shows an example dimension table that can be included in the star schema of FIG. 4.

FIG. 7 shows an example surrogate identification table that can be included in the star schema of FIG. 4.

FIG. 8 shows an example master data table that can be included in the star schema of FIG. 4.

FIG. 9 shows an example text table that can be included in the star schema of FIG. 4.

FIG. 15 shows a portion of a dimension table that has been formed through a resolution of the dimension table of FIG. 6, the surrogate identification table of FIG. 7, and the master data table of FIG. 8.

FIG. 17 shows an identification and a resolution of a set of tables that are related to an attribute in a dimension table in a warehouse schema.

FIG. 18 shows an identification and a resolution of a second set of tables that are related to a second attribute in the dimension table of FIG. 17.

Like reference symbols in the various drawings indicate like elements.

DETAILED DESCRIPTION

Figures 1, 2:
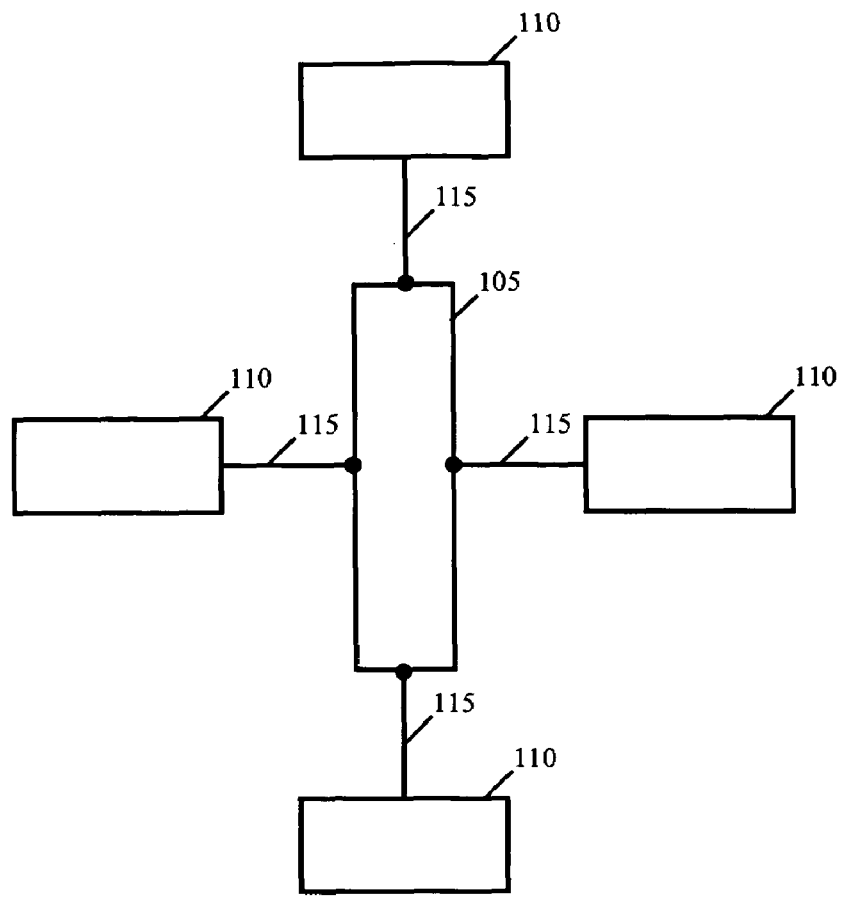
FIG. 1 is a schematic representation of an example star schema data structure.
FIG. 2 shows an example fact table that can be included in the star schema of FIG. 1.

FIG. 1 is a schematic representation of a first data structure, namely a star schema 100. Star schema 100 stores information for access by one or more data processing devices and/or data processing systems. The information in star schema 100 can concern a process of an enterprise such as a business.

Star schema 100 is a set of relational tables. In particular, star schema 100 includes a fact table 105, a collection of dimension tables 110, and a collection of join paths 115. Fact table 105 is a collection of data records that include measurements, metrics, and/or facts (hereinafter "facts"). The facts in fact table 105 can be keys in a dimension table 110. A key is a value that can be used to identify a record in a table.

Dimension tables 110 are collections of dimension records. Dimension records include collections of characteristics. Such characteristics comprise information that describes aspects of the facts in fact table 105.

Join paths 115 indicate relationships between the facts in fact table 105 and the attributes in dimension tables 110. For example, join paths 115 can indicate that facts in fact table 105 are keys such as primary keys that can be used to identify records in dimension tables 110.

FIG. 2 shows an example fact table 105, namely a fact table 200. Fact table 200 includes a collection of data records 205 and organizes facts into rows and columns. Each individual data record 205 can include facts regarding an individual sale transaction. For example, data records 205 set forth time facts in a time column 210, product facts in a product column 215, location facts in a location column 220, and additional facts in one or more additional columns 225. Time column 210 can include data that describe the time at which product sales occurred, product column 215 can include data that describe the products that were sold, location column 220 can include data that describe the locations at which products were sold, and additional columns 225 can include data that describe one or more additional facts regarding the sales. Examples of such additional facts include, e.g., the salesperson, the price at which the products were sold, and the number of units sold. The data in records 205 can be keys in one or more dimension tables 110.

Figures 3, 4:
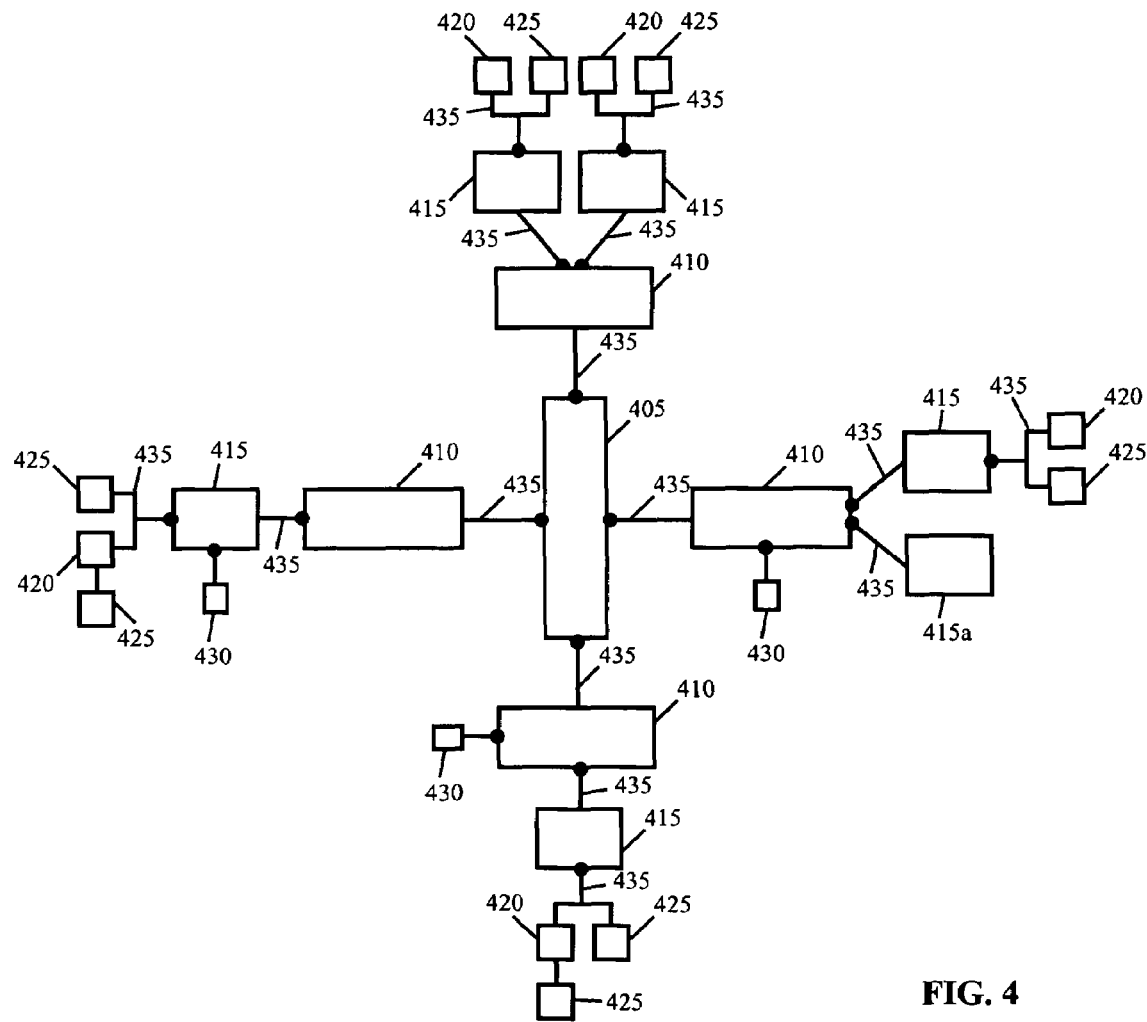
FIG. 3 shows an example dimension table that can be included in the star schema of FIG. 1.
FIG. 4 is a schematic representation of an example warehouse schema data structure.

FIG. 3 shows an example dimension table 110, namely a dimension table 300. Dimension table 300 includes a collection of data records 305, 310, 315, 320, 325, 330 and organizes the characteristics therein into rows and columns. In particular, data records 305, 310, 315, 320, 325, 330 set forth location keys in a key column 335, location street numbers in a street number column 340, location streets in a street column 345, location cities in a city column 350, location states in a state column 355, and additional location attributes in one or more additional columns 360. Key column 335 can include primary keys that can be used to identify individual ones of data records 305, 310, 315, 320, 325, 330. Street number column 340 can include data that describe a street number attribute at the different locations. Street column 345 can include data that describe a street name attribute at the different locations. City column 350 can include data that describe a city attribute at the different locations. State column 355 can include data that describe a state attribute at the different locations. Additional columns 360 can include data that describe one or more additional attributes at the different locations. Examples of such additional attributes include, e.g., the county, the country, the region, and/or the continent of the different locations.

Other dimension tables 110 can include keys set forth in fact table 105. For example, a time dimension table can include primary keys set forth in time column 210 of fact table 200 (FIG. 2). As another example, a product dimension table can include primary keys set forth in product column 215 of fact table 200 (FIG. 2).

In operation, a user can perform a query or other operation on the information stored in star schema 100 using a data processing device. For example, a user can query to determine a number of sales that occurred in the state of California. The data processing device can use the characteristics described in state column 355 to identify keys in key column 335 (such as the value "176") with the desired state attribute. The data processing device can then use the keys from key column 335 to identify sales transactions that occurred in California by locating these keys in location column 220 of fact table 200 (FIG. 2).

FIG. 4 is a schematic representation of a second data structure, namely a warehouse schema 400. Warehouse schema 400 stores information for access by one or more data processing devices and/or data processing systems. The information in warehouse schema 400 can concern a process of an enterprise such as a business.

Warehouse schema 400 is a set of relational tables. In particular, warehouse schema 400 includes a fact table 405, a collection of dimension tables 410, a collection of surrogate identification tables 415, a collection of master data tables 420, a collection of text tables 425, and a collection of join paths 435.

Fact table 405 is a collection of data records that include facts. The facts in fact table 405 can be keys in dimension tables 410. Dimension tables 410 are collections of characteristics that include data describing attributes of facts in fact table 405. Dimension tables 410 can be related to a single fact table 405 and thus appear exclusively in a single warehouse schema 400. The characteristics in dimension tables 410 can be numeric.

Surrogate identification tables 415 are collections of records that include mapping information. In particular, surrogate identification tables 415 include information for mapping characteristics in dimension tables 410 to objects and/or to characteristics in other tables. As used herein, objects are collections of information that is grouped together and treated as a primitive in a data processing environment. A data object is generally free of internal references and information stored in a data object can be changed without concomitant changes to the data processing instructions that handle the data object. The information in a data object can be stored in a contiguous block of computer memory of a specific size at a specific location.

Objects can represent a concrete or abstract real-world entity. An object can be of a certain object type, with individual objects being instances of that type. The entities represented by an object can include, e.g., a set of data processing instructions (such as a program), a data structure (such as a table), individual entries in a data structure (such as a record in a table), a data processing system, a customer, a product, a time, or a location. Surrogate identification tables 415 can be related to several different fact tables and thus can appear in multiple warehouse schemata.

The mapping information in individual surrogate identification tables 415 can relate to classes of objects with common features. For example, "time independent" surrogate identification tables 415 can map characteristics in dimension tables 410 to objects that include attributes to which time information is relatively unimportant. For example, an employee object that includes the name, gender, date of birth, and social security number of an employee can be considered an object having attributes to which time information is relatively unimportant. In particular, these attributes are unlikely to change and the time of any such a change is not typically relevant to the data processing activities. Since time information is relatively unimportant to these attributes, such time independent surrogate identification tables 415 need not include time information.

"Time dependent" surrogate identification tables 415 are another example of a class of surrogate identification table 415. Time dependent surrogate identification tables 415 can map characteristics in dimension tables 410 to objects that include attributes to which time information is relevant to data processing activities. For example, an employee object that includes the position and department attributes of an employee in a company can be considered an object having attributes to which time information is potentially relevant. In particular, the chronological history of an employee's position and department assignments may be relevant to data processing activities in the company. Since time information is potentially relevant to these attributes, time independent surrogate identification tables 415 can include time information. In the employee object example discussed above, this time information could include time stamps that describe "valid from" and "valid to" dates for the mapped position and department attributes of the employee.

Another class of surrogate identification table 415 can map dimension table characteristics exclusively to characteristics in that individual surrogate identification table. FIG. 4 shows an example of such a table, namely surrogate identification table 415a. Since surrogate identification table 415a maps dimension table characteristics exclusively to characteristics in that surrogate identification table 415, there are no join paths 435 that originate from surrogate identification table 415a.

Object tables 420 are collections of objects in the data processing system. The objects can be relevant to multiple processes and/or areas in an enterprise such as a business. For example, objects can describe characteristics of products, employees, customers, or other entities that are relevant to multiple portions of an enterprise. The objects in tables 420 can be dependent attributes of dimension record data in dimension tables 410. Object tables 420 can be related to several different fact tables and thus can appear in multiple warehouse schemata.

Text tables 425 are collections of textual descriptions of characteristics. The characteristics described by text tables can be found in, e.g., surrogate identification tables 415 or object tables 420. The textural descriptions provided by text tables 425 are typically natural language descriptions. For example, text tables 425 can provide natural language descriptions of dimension record data in different languages. Text tables 425 can be related to a several different fact tables and thus can appear multiple warehouse schemata.

Hierarchy tables 430 are special purpose collections of information derived from a master hierarchy. A hierarchy is a representation of the organization of common values of a characteristic in a tree structure. Hierarchy tables 430 can be created from a master hierarchy by selecting common values of a characteristic that stand in a particular parent-child relationship in the tree structure. Hierarchy tables 430 can thus be limited to a single column that describes the common values of a characteristic that stand in the particular parent-child relationship. The special purposes for which hierarchy tables 430 can be created include searching for facts that are relevant to characteristics that that stand in the particular parent-child relationship. Hierarchy tables 430 can be related to a several different fact tables and thus can appear multiple warehouse schemata.

Join paths 435 indicate relationships between the facts in fact table 405, the attributes in dimension tables 410, the mapping information in surrogate identification tables 415, the objects in object tables 420, the text in text tables 425, and the hierarchical information in hierarchy tables 430.

FIG. 5 shows an example fact table 405, namely a fact table 500. Fact table 500 includes a collection of data records 505 and organizes facts into rows and columns. Each individual data record 505 can include facts regarding an individual event, such as an individual sales transaction. The data in records 505 can include primary keys in one or more dimension tables 410. Columns that store keys in dimension tables can be denoted by a name indicative of their content, such as, e.g., names with a prefix "key_." Such column names can also include a name of a warehouse schema in which fact table 405 appears, as well as an indicator of the dimension. The dimension indicator can be a suffix such as the one letter suffices "P," "T," "U," "1," "2," etc.

The data in records 505 can also include key figure values. Key figure values are values that are calculated from the key figures of the warehouse schema. Key figure values can be calculated using a formula or other algorithm. Columns that include key figure values can be denoted by a name indicative of this content, such as, e.g., a prefix indicative of the namespace of the key figure (e.g., /BIC/) and the technical name of the key figure.

The data in records 505 can also include information used in partitioning. Columns that include information used in partitioning can be denoted by a name indicative of this content such as, e.g., the technical name of a characteristic used for partitioning.

FIG. 6 shows an example dimension table 410, namely a dimension table 600. Dimension table 600 includes a collection of data records 605 and organizes the dimension information therein into rows and columns. In particular, data records 605 set forth dimension keys in a key column 610, city attributes in a city column 615, country attributes in a country column 620, and region attributes in a region column 625. Key column 610 can include primary keys that can be used to identify individual data records 605. The attributes in columns 615, 620, 625 can be foreign keys to one or more surrogate identification tables.

Columns in dimension table 410 that hold dimension keys (such as column 610) can be denoted by a name indicative of their content, such as, e.g., "DIMID." Columns in dimension table 410 that hold attributes can be denoted by a name indicative of this content such as, e.g., the technical name of an attribute.

FIG. 7 shows an example surrogate identification table 415, namely a surrogate identification table 700. Surrogate identification table 700 includes a collection of data records 705 and organizes the mapping information therein into rows and columns. In particular, data records 705 set forth keys in a key column 710 and one or more keys for mapping to characteristics in columns 715, 720, 725, 730.

FIG. 8 shows an example object table 420, namely an object table 800. Object table 800 includes a collection of objects 805 and organizes the information therein into rows and columns. In particular, object table 800 sets forth keys in a key column 815 and objects 805 in columns 810, 820, 825, 830.

FIG. 9 shows an example text table 425, namely a text table 900. Text table 900 includes a collection of text records 905 that include textual descriptions of characteristics. For example, a first text record 905 can set forth that the textural description of the standard ISO coding "CA" is "Canada" in English but "Kanada" in German.

Figure 10:
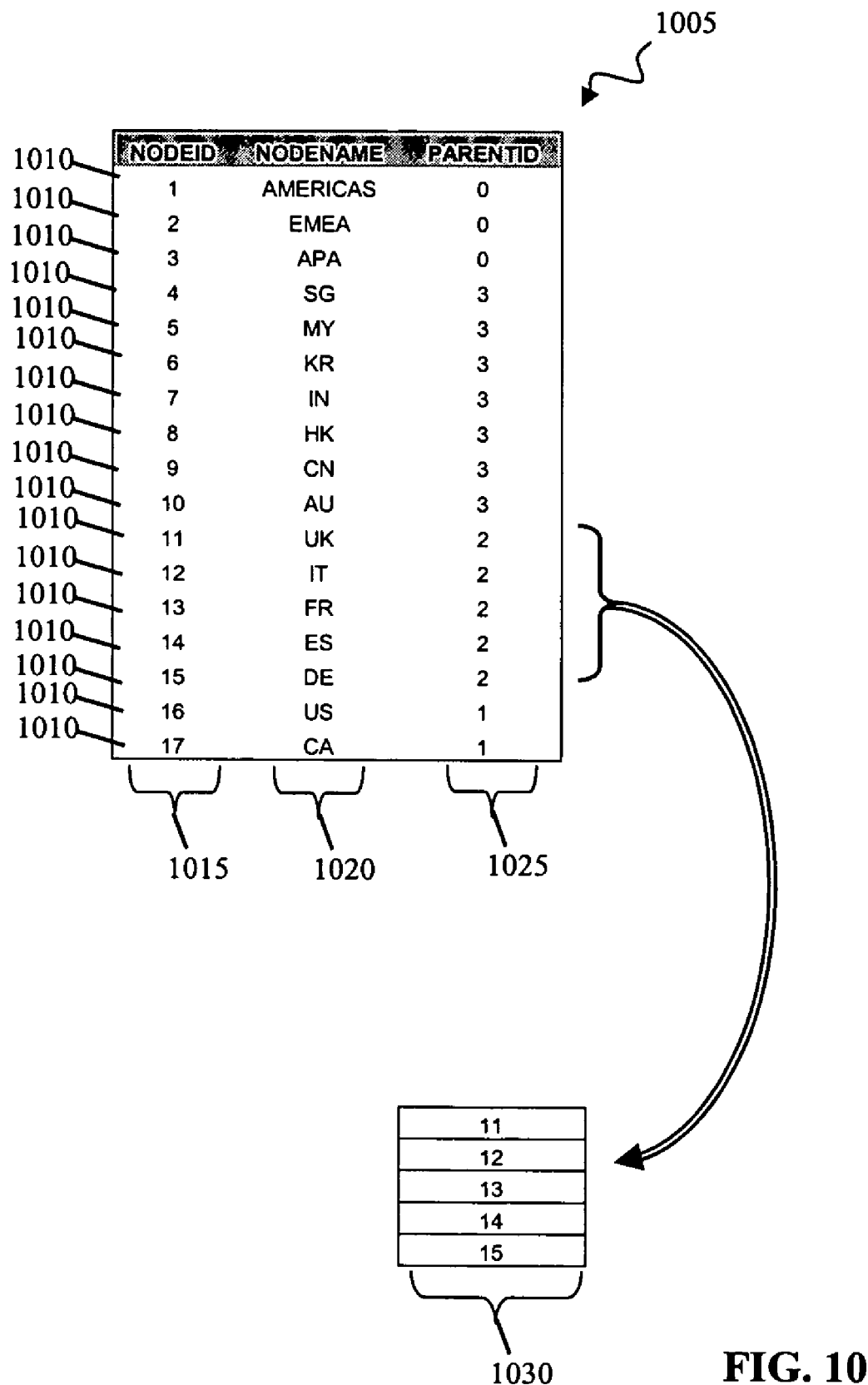
FIG. 10 shows an example hierarchy table that can be included in the star schema of FIG. 4.

FIG. 10 shows an example hierarchy table 430, namely a temporary hierarchy table 1000. As illustrated, temporary hierarchy table 1000 can be formed from a master hierarchy table 1005 for a specific data processing activity.

In particular, master hierarchy table 1005 includes a collection of master hierarchy records 1010 that are denoted as being in various parent-child relationships. Each hierarchy record 1010 can thus correspond to a node in the hierarchy. Hierarchy table 1000 includes a node identity column 1015, an object name column 1020, a node name column 1025, a level column 1030, and a parent ID column 1035.

Node identity column 1015 can identify a particular hierarchy record 1010. Node name column 1020 can identify a particular hierarchy record 1010 by text or other name. Parent ID column 1025 can identify the parent hierarchy record 1010 of each hierarchy record 1010.

In contrast, temporary hierarchy table 1000 includes a column 1030 that sets forth the identity of one or more nodes in the hierarchy. Nodes can be identified by information from node identity column 1015 (as shown), information from node name column 1020, or by other information. The nodes identified in column 1030 can have a common trait. Such a common trait can be used to generate temporary hierarchy table 1000 from master hierarchy table 1005. For example, the nodes identified in column 1030 all depend from the node named "BMEA" (i.e., node ID "2") in master hierarchy table 1005. These nodes can be selected from master hierarchy table 1005 on the basis of this dependency and used to establish temporary hierarchy table 1000. Temporary hierarchy table 1000 can be used when searching warehouse schema 400. For example, temporary hierarchy table 1000 can be used to rapidly identify data associated with a certain branch in a hierarchy described by master hierarchy table 1005.

Figure 11:
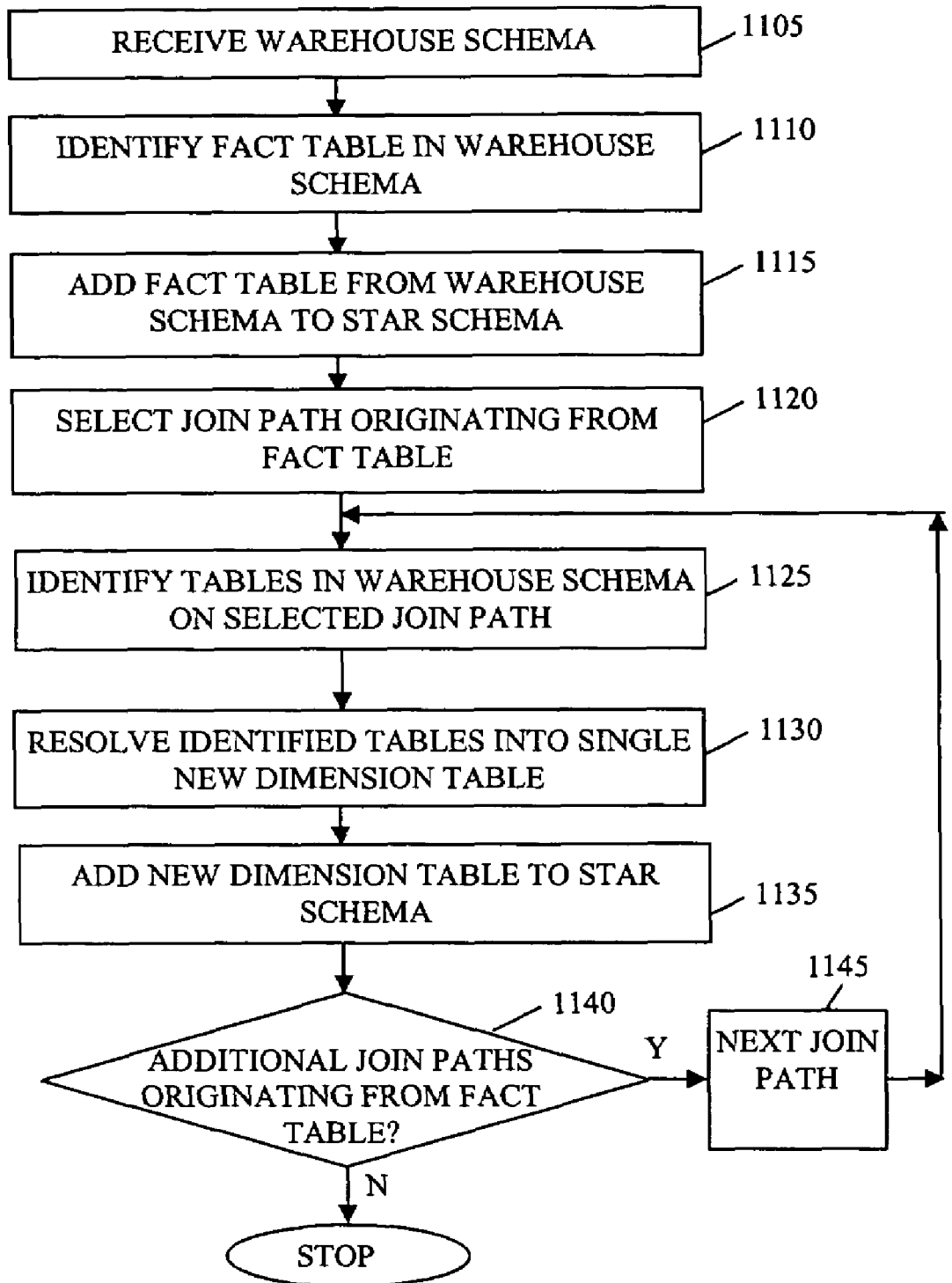
FIG. 11 is a flow chart of a first process for mapping a warehouse schema to a star schema.

FIG. 11 is a flow chart of a first process 1100 for mapping a warehouse schema to a star schema. Process 1100 can be performed by a data processing device on a warehouse schema such as warehouse schema 400 to generate a star schema such as star schema 100.

The data processing device that performs process 1100 can receive a warehouse schema at 1105. The warehouse schema can be received as an electronic signal or in tangible form, such as when stored in a memory device. The warehouse schema can be received as a unitary whole, in pieces, or in packets. For example, a data address associated with a fact table can be received by a data processing device, which in turn can use the address to access the fact table and other associated tables.

Figure 12:
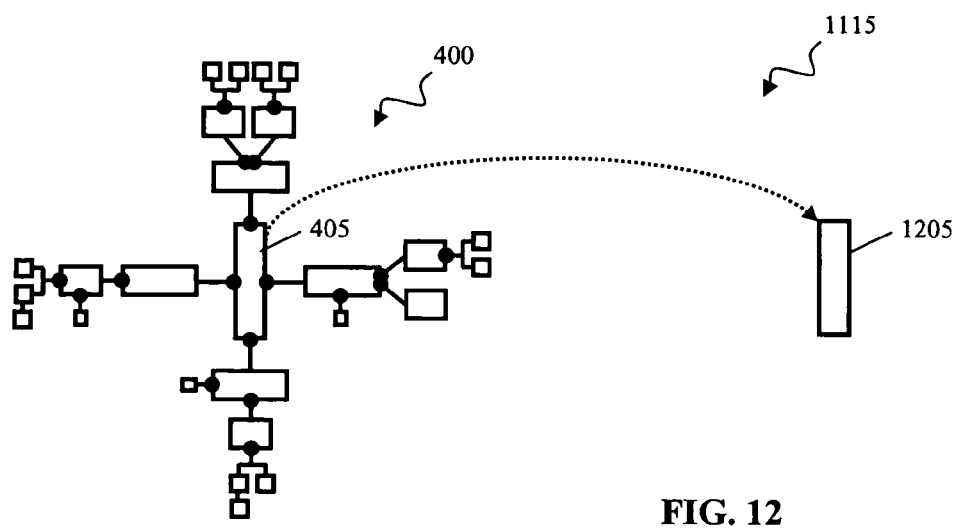
FIG. 12 shows an addition of a fact table from a warehouse schema to a star schema.

The device that performs process 1100 can identify a fact table in the received warehouse schema at 1110 and add it to a star schema at 1115. For example, the warehouse schema fact table can remain stored in the same location and identified elsewhere as a foundation of the star schema. FIG. 12 shows an alternative addition in which fact table 405 is copied from warehouse schema 400 to form a second fact table 1205 at a different memory location as the foundation of the star schema.

Returning to FIG. 11, the device that performs process 1100 can select a join path that originates from the identified fact table at 1120. The device can also identify a set of one or more dimension tables, surrogate identification tables, master data tables, and/or text tables in a warehouse schema that are on the selected join path at 1125. The tables on a join path can connect to the join path directly or connect to the join path through one or more additional join paths that branch from the table(s) on the selected join path. In other words, the device identifies tables that are joined together by join paths without passing through the fact table. For example, a first table is related to a second table if the first table includes keys in the second table. As another example, a first table is related to a second table if data in the first table can be mapped to keys in a second table, e.g., using mapping information such as found in a surrogate ID table.

Figure 13:
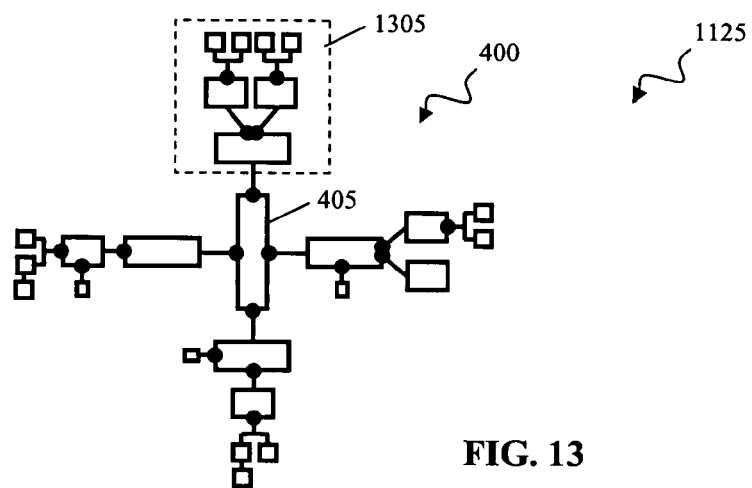
FIG. 13 shows an identification of a set of tables on a join path in a warehouse schema.

FIG. 13 illustrates one example of the identification of a set 1305 of tables on a join path 1310. As can be seen, the tables in set 1305 are all joined by join paths that do not pass through fact table 405.

Returning to FIG. 11, the device that performs process 1100 can resolve the identified set of related warehouse tables into a single dimension table at 1130. Resolving a set of related tables generally includes arranging some or all of the contents of the tables into rows and columns in a single table. Every table in a set need not be resolved into a single dimension table. For example, selected related tables can be omitted from the resolved dimension table. Further, one. or more portions of the contents of a related table can be omitted from the resolved dimension table. For example, numeric keys from a related table that are redundant with text or other data in the same or different related tables can be omitted from the resolved dimension table. Resolving a set of related tables can be done, e.g., by materializing foreign key—key relationships between the tables or by describing such a materialization in the form of a logical view.

The resolved dimension table can be added to a star schema at 1135. For example, the resolved dimension table can be denoted as associated with fact table 1205 in the star schema.

Figure 14:
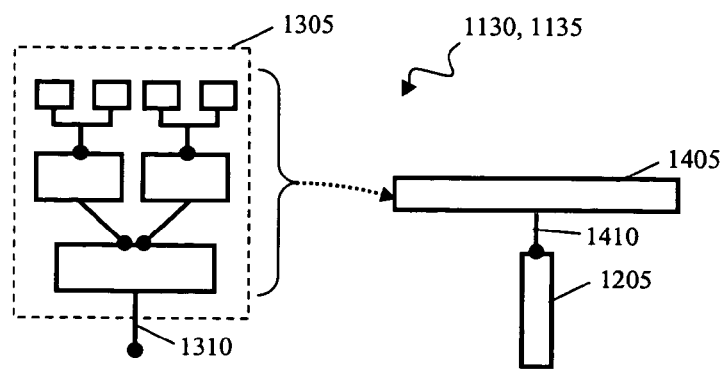
FIG. 14 shows a resolution of a set of tables to form a single dimension table.

FIG. 14 schematically illustrates the resolution of the set of tables 1305 to form a single dimension table 1405 and the addition of dimension table 1405 to the star schema that contains fact table 1205.

FIG. 15 shows a portion of a single dimension table 1500 that has been formed through a resolution of several related tables. In particular, the illustrated portion of dimension table 1500 has been formed by resolving dimension table 600 (FIG. 6), surrogate identification table 700 (FIG. 7), and master data table 800 (FIG. 8). Table 1500 also includes data 1505 drawn from dimension table 600, data 1510 drawn from surrogate identification table 700, data 1515 drawn from master data table 800, as well as additional data 1520 drawn from tables 600, 700, 800, and/or other related tables. Other types of resolutions will yield different tables 1500.

In particular, data 1505 includes data drawn from key column 610 and sets forth dimension keys that can be used to identify individual records in table 1500. Data 1510 includes data drawn from columns 715, 720, 725, 730. Data from column 710 has been omitted from table 1510 as redundant with the data in column 610. Data 1515 includes data drawn from columns 810, 820, 825, 830. Data from column 815 has been omitted from table 1510 as redundant with the data in column 730.

Returning to FIG. 11, the device that performs process 1100 determines if additional join paths originate from the fact table in the warehouse schema at 1140. If the device determines that additional join paths are to be present, process 1100 moves to the next join path at 1145 and returns to 1120 to identify tables on this next path. If the device determines that no additional tables are to be added, process 1100 can end.

Every table on every join path that originates in a fact table need not be added to the star schema. Rather, join paths and tables can be selected for addition based on user input, the desired functionality, and/or other grounds.

Figure 16:
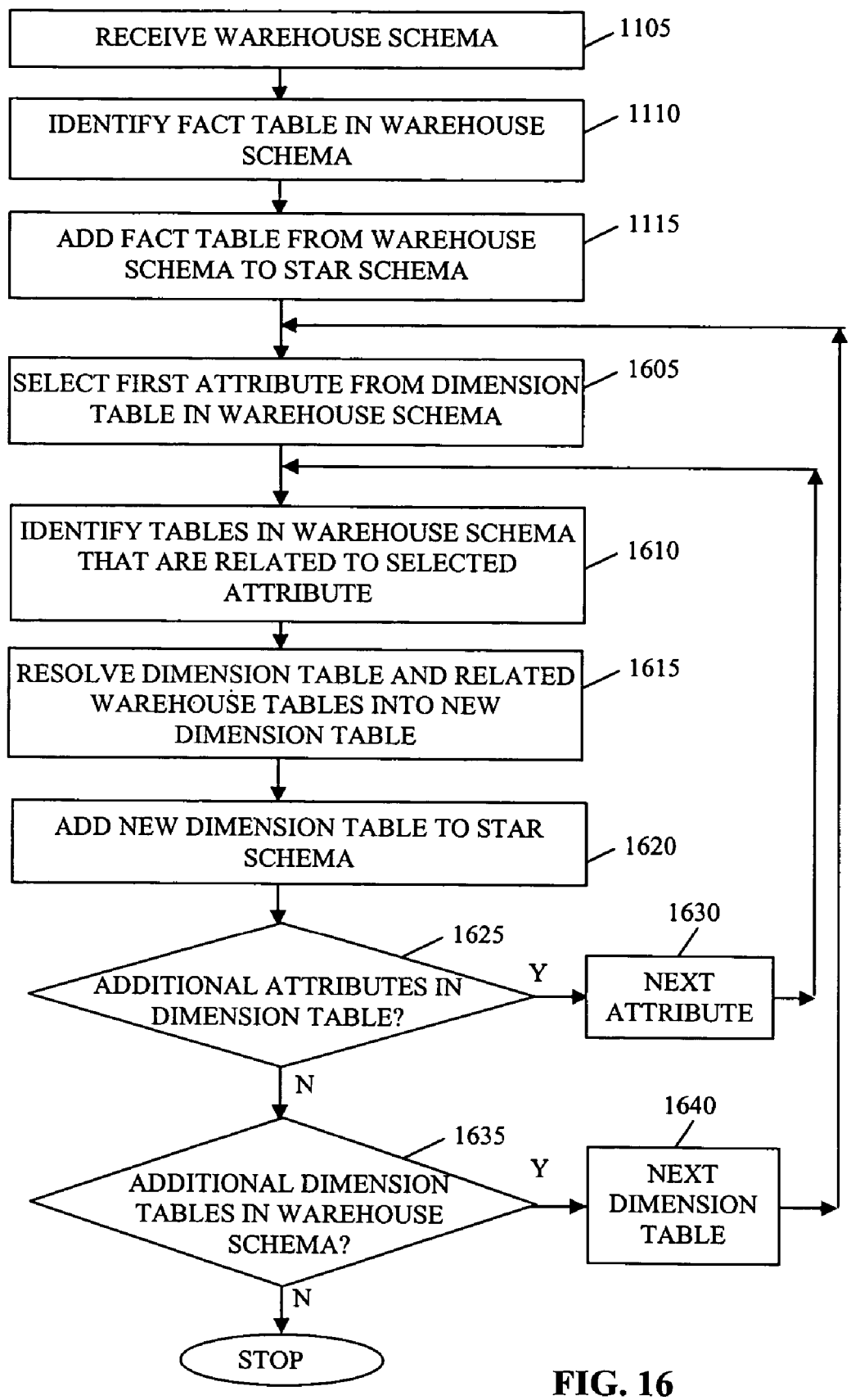
FIG. 16 is a flow chart of a second process for mapping a warehouse schema to a star schema.

FIG. 16 is a flow chart of a second process 1600 for mapping a warehouse schema to a star schema. Process 1600 can be performed by a data processing device on a warehouse schema such as warehouse schema 400 to generate a star schema such as star schema 100.

The data processing device that performs process 1600 can receive a warehouse schema at 1105, identify a fact table in the received warehouse schema at 1110, and add the identified fact table to a star schema at 1115.

The data processing can also select a first attribute from a dimension table at 1605. The data processing device can then identify a set of one or more surrogate identification tables, master data tables, and/or text tables in the warehouse schema that are related to the selected attribute at 1610. Tables that are related to a selected attribute in a dimension table are joined to the dimension table on a join path involving the selected attribute. For example, tables that are related to a selected attribute in a dimension table are those in which the attribute is a key or in which the attribute can be mapped to a key. For example, an attribute can be mapped to a key in a related table through mapping information in a surrogate identification table.

The device that performs process 1600 can resolve the identified set of tables that are related to an attribute and the dimension table that includes the attribute into a single dimension table at 1615. Every table in such a set need not be resolved into a single dimension table. Further, one or more portions of the contents of a related table can be omitted from the resolved dimension table. The resolved dimension table can be added to a star schema at 1620.

FIG. 17 illustrates one example of the identification and the resolution of a set 1705 of tables that are related to an attribute in dimension table 410. As can be seen, the tables in set 1705 are all joined to dimension table 410 on a join path 1710 that involves the selected attribute. Set 1705 is resolved into a single dimension table 1715 which is added to an incipient star table when join path 1720 is established between fact table 1725 and dimension table 1715.

Returning to FIG. 16, the device that performs process 1600 can determine if another attribute in the dimension table is related to other tables in the warehouse schema at 1625. If so, the device can advance to that attribute at 1630 and return to 1610 to identify tables that are related to that attribute.

FIG. 18 illustrates one example of the identification and the resolution of a second set 1805 of tables that are related to a second attribute in dimension table 410. As can be seen, the tables in second set 1805 are all joined to dimension table 410 on a join path 1810 that involves the second attribute. Set 1805 can be resolved into a single dimension table 1815 which is added to an incipient star table when join path 1820 is established between fact table 1725 and dimension table 1815.

Returning to FIG. 16, if the device that performs process 1600 determines that no additional tables are to be added, the device can also determine if there is an additional dimension table in the warehouse schema at 1630. If so, the device cans advance to the additional dimension table at 1640 and return to 1605 to identify a first attribute in the additional table.

A new dimension table need not be created for every attribute. Further, every table that is related to any attribute need not be added to the star schema. Rather, attributes and tables can be omitted or redacted based on user input, the desired functionality, and/or other grounds.

Figure 19:
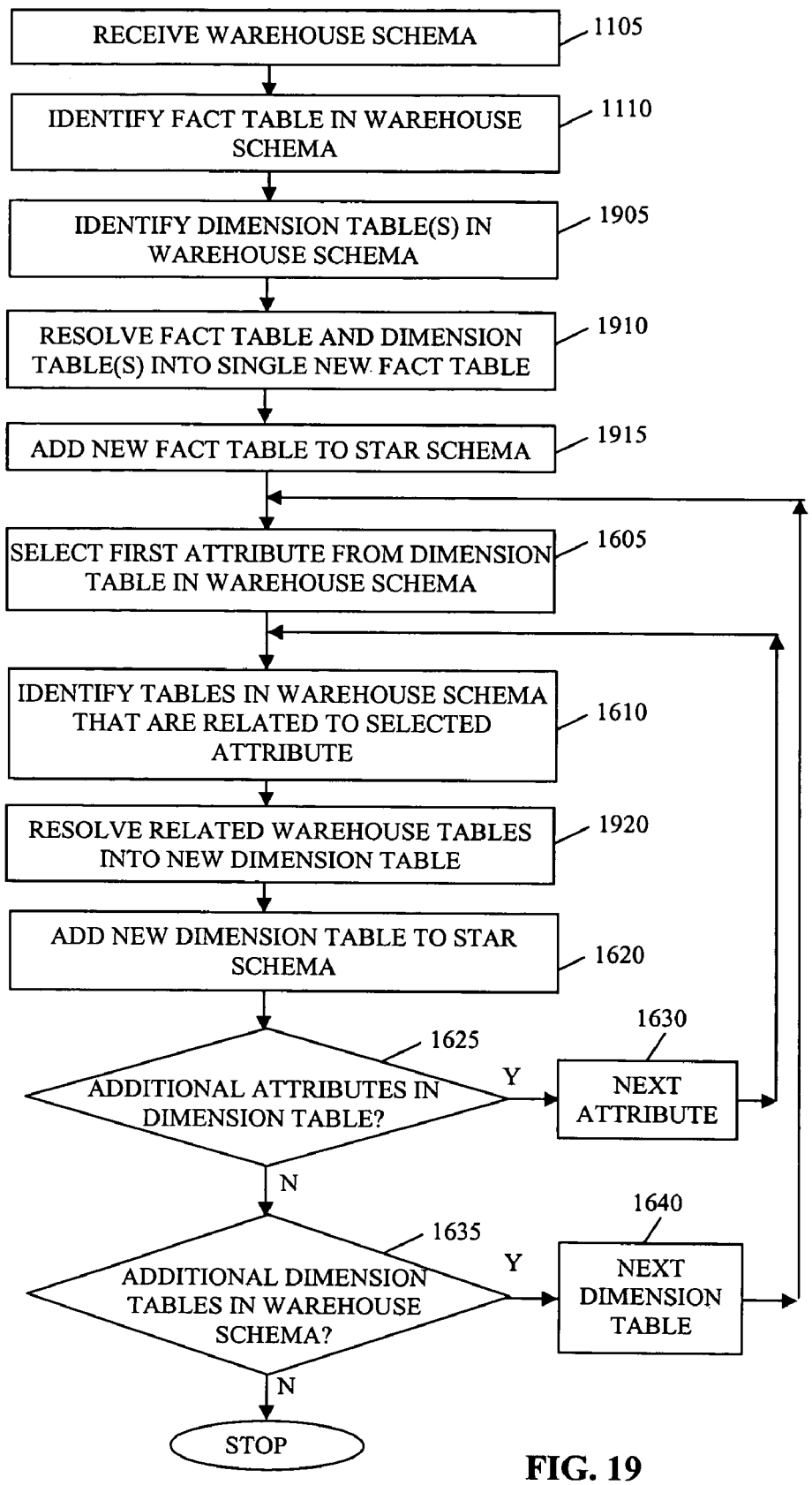
FIG. 19 is a flow chart of a third process for mapping a warehouse schema to a star schema.

FIG. 19 is a flow chart of a third process 1900 for mapping a warehouse schema to a star schema. Process 1900 can be performed by a data processing device on a warehouse schema such as warehouse schema 400 to generate a star schema such as star schema 100.

The data processing device that performs process 1900 can receive a warehouse schema at 1105 and identify a fact table in the received warehouse schema at 1110. The data processing device can also identify one or more dimension tables in the received warehouse schema at 1905.

The data processing can also resolve the identified fact table and one or more dimension tables into a single new fact table at 1910. For example, the contents of the dimension tables can be added to the rows and columns of the identified fact table to form the new fact table. Alternatively, the new fact table can be created in a different memory location using the contents of the identified fact and dimension tables. One or more portions of the contents of the identified fact and dimension tables can be omitted from the new fact table. For example, numeric keys from the identified fact table that are redundant with text or other data in the one or more dimension tables can be omitted from the new fact table. The device that performs process 1900 can add the new fact table to a star schema at 1915.

Figure 20:
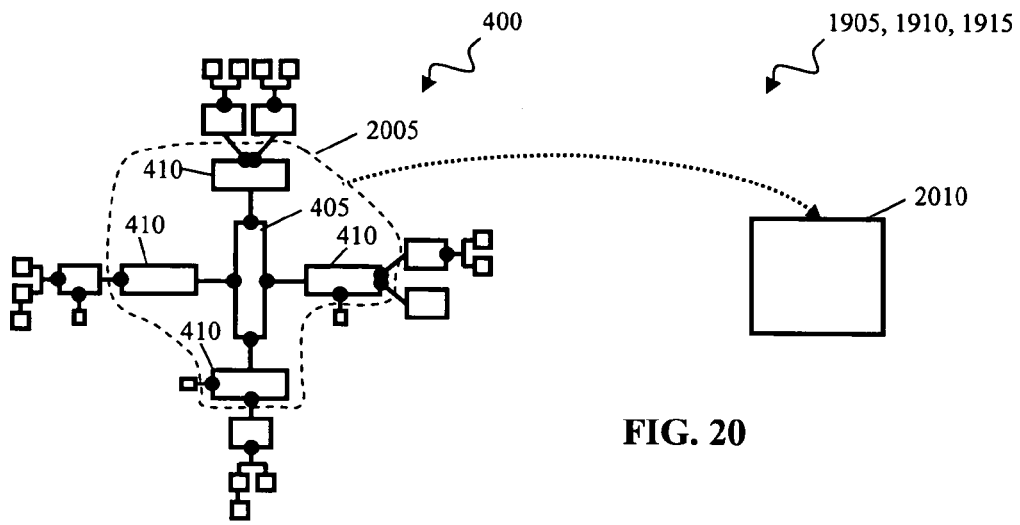
FIG. 20 shows an identification and a resolution of a set of tables that includes a fact table and dimension tables in a warehouse schema.

FIG. 20 illustrates one example of the identification and resolution of a set 2005 that includes fact table 405 and dimension tables 410. Set 2005 is resolved into a single new fact table 2010 which is to serve as the foundation of a new star schema.

The data processing device can also select a first attribute from a dimension table identified in the source warehouse schema at 1605, along with a set of one or more surrogate identification tables, master data tables, and/or text tables in the warehouse schema that are related to the selected attribute at 1610.

The device can then resolve the identified set of tables that are related to an attribute into a single dimension table at 1920. Please note that, in contrast with step 1615 of FIG. 16, the dimension table that includes the attribute is not resolved along with the set of related tables. Rather, the dimension table that includes the attribute is omitted from the resolution since the information in the dimension table that includes the attribute is resolved in the fact table of the new star schema.

Every table, and the entire contents of a table, that is related to any attribute need not be added to the star schema. Rather, tables can be omitted or redacted based on user input, the desired functionality, and/or other grounds. The resolved dimension table can be added to a star schema at 1620.

Figure 21:
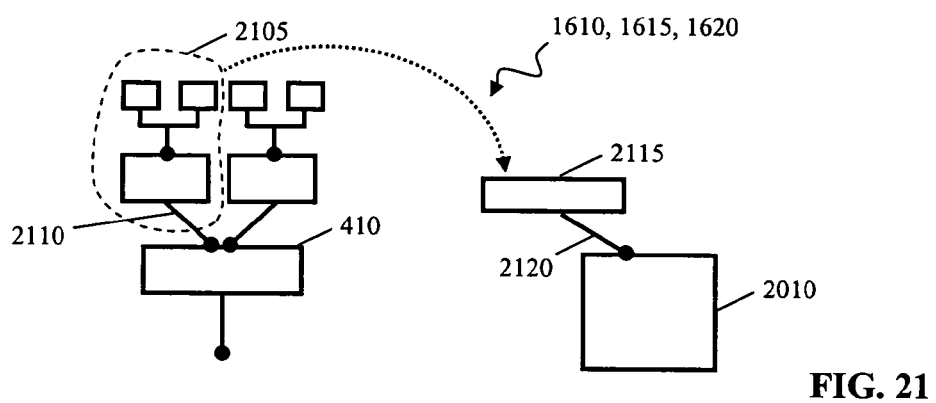
FIG. 21 shows an identification and a resolution of a set of tables that are related to an attribute in a dimension table in a warehouse schema.

FIG. 21 illustrates one example of the identification and resolution of a set 2105 of tables that are related to an attribute in dimension table 410. As can be seen, the tables in set 2105 are all joined to dimension table 410 on a join path 2110 that involves the selected attribute. Set 2105 is resolved into a single new dimension table 2115 which is added to an incipient star table when join path 2120 is established between fact table 2010 and new dimension table 2115.

Returning to FIG. 19, the device that performs process 1900 can determine if another attribute in the dimension table is related to other tables in the warehouse schema at 1625. If so, the device can advance to that attribute at 1630 and return to 1610 to identify tables that are related to that attribute.

If the device that performs process 1900 determines that no additional tables are to be added, the device can also determine if there is an additional dimension table in the warehouse schema at 1630. If so, the device can advance to the additional dimension table at 1640 and return to 1605 to identify a first attribute in the additional table.

A new dimension table need not be created for every attribute. Further, every table that is related to any attribute need not be added to the star schema. Rather, attributes and tables can be omitted or redacted based on user input, the desired functionality, and/or other grounds.

Figure 22:
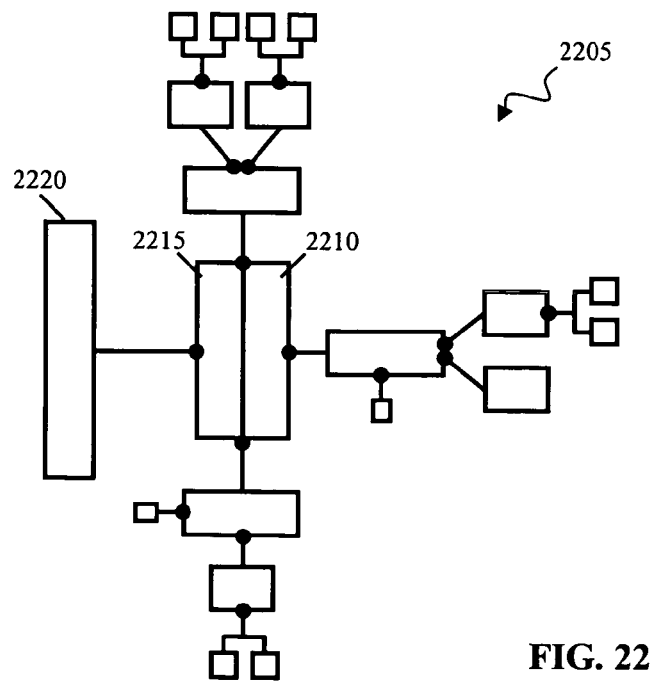
FIG. 22 schematically illustrates another implementation of a warehouse schema.

FIG. 22 schematically illustrates another implementation of a warehouse schema, namely a warehouse schema 2205. Warehouse schema 2205 can be an SAP BW Star Schema such as those found in releases subsequent to the SAP BW 2.0A release (1999) (SAP AG, Walldorf, Germany). Warehouse schema 2205 includes a pair of fact tables 2210, 2215, a line item dimension 2220, along with a collection of dimension tables, a collection of surrogate identification tables, a collection of master data tables, a collection of text tables, and a collection of join paths.

Fact tables 2210, 2215 can have identical columns. Fact tables 2210, 2215 can also have identical physical layouts. Alternatively, fact tables 2210, 2215 can be partitioned differently or have different indices. Fact tables 2210, 2215 can store identical older information but can store different newly loaded information.

In particular, during data storage operations, fact table 2210 can receive newly loaded data in separate requests. The newly loaded data can be represented by an artificial key column. In contrast, fact table 2215 can receive consolidated requests formed by multiple requests to fact table 2210. New data can thus be entered first piecewise into fact table 2210 and subsequently moved in consolidated aggregates from fact table 2210 to fact table 2215.

Line item dimension 2220 is a collection of data records that include only a single characteristic. The characteristics included in a line item dimension do not join to a surrogate identification table or any other table. Rather, information typically stored in a surrogate information table, such as information for mapping to objects, can be included in line item dimension 2220. For example, line item dimension 2220 can map facts (such as an order number) directly to objects such as a purchase order object. In operation, during mapping, line item dimension 2220 can be handled like a dimension table.

Warehouse schema 2205 can be mapped to a star schema such as star schema 100 (FIG. 1) using processes described herein. For example, fact tables 2210, 2215 can be combined in a single unified fact table (referred to as the "V-View" in releases subsequent to the SAP BW 2.0A release (SAP AG, Walldorf, Germany)) and then mapped to a star schema using one or more of processes 1100, 1600, 1900 (FIGS. 11, 16, and 19).

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

The computing environment can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Accordingly, other implementations are within the scope of the following claims.

What is claimed is:

1. An article comprising a machine-readable storage medium storing instructions that, when executed, cause one or more machines to perform operations comprising:
receiving a first data storage schema comprising a first fact table storing first facts, a collection of dimension tables storing first characteristics describing attributes of the first facts, one or more surrogate identification tables each storing mapping information that maps the first characteristics of one of the collection of dimension tables to objects or other characteristics in other tables, a line item dimension comprising a collection of data records that each include only a single characteristic that maps the first facts in the first fact table to an object, a time independent surrogate identification table, a time dependent surrogate identification table, and a plurality of first join paths, each first join path originating from the first fact table and connecting to one of the collection of dimension tables, the time independent surrogate identification table including only time independent information and mapping the single characteristic to a first object that includes only time independent attributes of the first attributes, the time independent attributes either being constant with time or having no effect on a result of a data processing activity if the time independent attributes change, the time dependent surrogate identification table including time dependent information and mapping the single characteristic to a second object that includes only time dependent attributes of the first attributes that are not constant and that have an effect on the result of the data processing activity if the time dependent attributes change;
generating a second data storage schema comprising a second fact table comprising at least some of the first facts drawn from the first fact table and at least some characteristics drawn from the line item dimension;
identifying, for each join path of the plurality of join paths, the one of the collection of dimension tables on the join path and one or more first surrogate dimension tables, first master data tables, and first text tables that are part of the first data storage schema and that are either on the first join path or connected to the first join path via one or more second join paths that branch from the first path but do not pass through the first fact table;
resolving the identified one dimension table and the one or more first surrogate dimension tables, first master data tables, and first text tables into a single new dimension table, the resolving comprising arranging at least some contents of the identified one dimension table and the one or more first surrogate dimension tables, first master data tables, and first text tables into rows and columns in the single new dimension table; and
adding each single new dimension table to the second data storage schema.

2. The article of claim 1, wherein the new fact table comprises at least some information drawn from at least one of the collection of dimension tables.

3. The article of claim 1, wherein generating the new data storage schema comprises generating a star schema.

4. The article of claim 1, wherein the new dimension table comprises at least some characteristics drawn from one or more of the collection of the dimension tables.

5. The article of claim 1, wherein:
the first data storage schema further comprises a third fact table; and
generating the second data storage schema comprises combining the first fact table and the third fact table.

6. The article of claim 1, wherein generating the second data storage schema further comprises generating a second dimension table so that it includes at least some characteristics drawn from at least one of the first object and the second object.

7. The article of claim 6, wherein generating the second dimension table comprises generating the new dimension table so that it includes characteristics drawn from only one of the first object and the second object.

8. The article of claim 1, wherein generating the second data storage schema comprises resolving one or more surrogate identification tables that include information for mapping a characteristic into the new dimension table.

9. The article of claim 1, wherein generating the second data storage schema comprises resolving one or more text tables that include a textual description of dimension data into the new dimension table.

10. The article of claim 1, wherein generating the second data storage schema comprises copying the first fact table to generate the new fact table.

11. A method comprising:
receiving a first data storage schema that includes a first fact table storing first facts, one or more dimension tables that are exclusive to the first fact table and that store first characteristics describing first attributes of the first facts, a plurality of first join paths that each originate from the first fact table and connect to one of the one or more dimension tables, and one or more additional tables that relate to the first characteristics in the one or more dimension tables, the one or more additional tables being selected from a group consisting of first surrogate dimension tables, first master data tables, and first text tables, the one or more additional tables further comprising a time independent surrogate identification table and a time dependent surrogate identification table, the time independent surrogate identification table including only time independent information and mapping the single characteristic to a first object that includes only time independent attributes of the first attributes, the time independent attributes either being constant with time or having no effect on a result of a data processing activity if the time independent attributes change, the time dependent surrogate identification table including time dependent information and mapping the single characteristic to a second object that includes only time dependent attributes of the first attributes that are not constant and that have an effect on the result of the data processing activity if the time dependent attributes change; and
generating a second data storage schema, the generating including:
creating a new fact table that includes data drawn from the first fact table, and
creating a new dimension table that relates to the new fact table,
identifying, for each join path of the plurality of join paths, the one dimension table on the join path and one or more of the additional tables that are either on the first join path or connected to the first join path via one or more second join paths that branch from the first path but do not pass through the first fact table;
resolving the identified one dimension table and one or more of the additional tables, into a single new dimension table, the resolving comprising adding at least some contents of the identified one dimension table and one or more of the additional tables into the new dimension table.

12. The method of claim 11, wherein the one or more additional tables further comprise one or more text tables that include a textual description of dimension data.

13. The method of claim 11, wherein the one or more additional tables further comprise one or more surrogate identification tables that include information for mapping the one or more characteristic to an object.

14. The method of claim 11, wherein the one or more additional tables further comprise one or more temporary hierarchy tables.

15. An article comprising a machine-readable storage medium storing instructions that, when executed, cause one or more machines to perform operations comprising:
receiving a first data storage schema that includes a first fact table storing first facts, one or more dimension tables that are exclusive to the first fact table and that store first characteristics describing first attributes of the first facts, a plurality of first join paths that each originate from the first fact table and connect to one of the one or more dimension tables, and one or more additional tables that relate to the first characteristics in the one or more dimension tables, the one or more additional tables being selected from a group consisting of first surrogate dimension tables, first master data tables, and first text tables, the one or more additional tables further comprising a time independent surrogate identification table and a time dependent surrogate identification table, the time independent surrogate identification table including only time independent information and mapping the single characteristic to a first object that includes only time independent attributes of the first attributes, the time independent attributes either being constant with time or having no effect on a result of a data processing activity if the time independent attributes change, the time dependent surrogate identification table including time dependent information and mapping the single characteristic to a second object that includes only time dependent attributes of the first attributes that are not constant and that have an effect on the result of the data processing activity if the time dependent attributes change; and
generating a second data storage schema, the generating including:
creating a new fact table that includes data drawn from the first fact table, and
creating a new dimension table that relates to the new fact table,
identifying, for each join path of the plurality of join paths, the one dimension table on the join path and one or more of the additional tables that are either on the first join path or connected to the first join path via one or more second join paths that branch from the first path but do not pass through the first fact table;
resolving the identified one dimension table and one or more of the additional tables, into a single new dimension table, the resolving comprising adding at least some contents of the identified one dimension table and one or more of the additional tables into the new dimension table.

16. The article of claim 15, wherein the operations further comprise resolving the identified one dimension table to at least one of the time independent surrogate identification table and the time dependent surrogate identification table.

17. The article of claim 16, wherein the operations further comprise resolving the identified one dimension table to only one of the time independent surrogate identification table and the time dependent surrogate identification table.

18. The article of claim 15, wherein generating the second data storage schema comprises generating a star data storage schema.

19. The article of claim 15, wherein the operations further comprise combining a pair of fact tables in the received first data storage schema to generate the first fact table.

20. The article of claim 15, wherein:
the new second fact table comprises a copy of the first fact table.

* * * * *

UNITED STATES PATENT AND TRADEMARK OFFICE
CERTIFICATE OF CORRECTION

PATENT NO. : 7,620,642 B2 Page 1 of 1
APPLICATION NO. : 11/302855
DATED : November 17, 2009
INVENTOR(S) : Zurek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 315 days.

Signed and Sealed this

Twenty-sixth Day of October, 2010

David J. Kappos
*Director of the United States Patent and Trademark Office*